United States Patent [19]

Nabors

[11] Patent Number: 4,547,536

[45] Date of Patent: Oct. 15, 1985

[54] POLYESTER BLENDS CONTAINING A METAL OXIDE DESICCANT

[75] Inventor: Lester G. Nabors, Akron, Ohio

[73] Assignee: Phillips Petroleum Company, Bartlesville, Okla.

[21] Appl. No.: 636,053

[22] Filed: Jul. 30, 1984

Related U.S. Application Data

[62] Division of Ser. No. 296,089, Aug. 26, 1981, Pat. No. 4,485,204.

[51] Int. Cl.$^4$ .................. C08K 3/20; C08L 67/00
[52] U.S. Cl. ..................... 523/514; 523/516; 523/522; 523/526; 524/430; 524/433; 524/437; 524/505; 524/513; 525/177
[58] Field of Search ............... 524/505, 513, 430, 433, 524/437; 525/177; 523/514, 516, 522, 526

[56] References Cited

U.S. PATENT DOCUMENTS

| | | | |
|---|---|---|---|
| 2,863,849 | 12/1958 | Fordham . | |
| 3,423,265 | 1/1969 | Ahles et al. . | |
| 3,492,264 | 1/1970 | Hahn . | |
| 3,562,200 | 2/1971 | Jones | 525/177 |
| 3,594,450 | 7/1971 | Herwig et al. . | |
| 3,637,911 | 1/1972 | Baum et al. . | |
| 3,659,896 | 5/1972 | Smith et al. . | |
| 3,769,260 | 10/1973 | Segal | 525/177 |
| 3,810,863 | 5/1974 | Hatton, Jr. et al. . | |
| 3,835,088 | 9/1974 | Takamiya et al. . | |
| 3,907,931 | 9/1975 | Durst . | |
| 3,969,313 | 7/1976 | Aishima et al. | 524/437 |
| 4,033,907 | 7/1977 | Wolf . | |
| 4,048,128 | 9/1977 | Eastman | 525/177 |
| 4,080,354 | 3/1978 | Kramer . | |
| 4,081,397 | 3/1978 | Booe . | |
| 4,081,496 | 3/1978 | Finlayson . | |
| 4,101,605 | 7/1978 | Gergen et al. . | |
| 4,154,774 | 5/1979 | Hinterwaldner | 525/40 |
| 4,158,654 | 6/1979 | Moczygemba et al. . | |
| 4,173,597 | 11/1979 | Willcox et al. . | |
| 4,185,047 | 1/1980 | Cohen . | |
| 4,188,316 | 2/1980 | Sawada . | |
| 4,193,908 | 3/1980 | Hsieh et al. . | |
| 4,197,377 | 4/1980 | Böhm et al. . | |
| 4,219,628 | 8/1980 | Weemes et al. . | |
| 4,220,735 | 9/1980 | Dieck et al. . | |
| 4,222,926 | 9/1980 | Mizuno et al. . | |
| 4,234,636 | 11/1980 | Thorsrud et al. . | |
| 4,243,579 | 1/1981 | Keogh . | |
| 4,267,286 | 5/1981 | Campbell . | |
| 4,271,064 | 6/1981 | Dieck . | |
| 4,271,065 | 6/1981 | Feldman | 523/514 |
| 4,284,540 | 8/1981 | Iida et al. . | |
| 4,327,199 | 4/1982 | Coran et al. . | |

FOREIGN PATENT DOCUMENTS 47-2947 12/1972 Japan .
0102768 9/1974 Japan .
2039918 8/1980 United Kingdom .

OTHER PUBLICATIONS

*Chemical and Engineering News*, Jan. 5, 1981, p. 30.
*Modern Plastics*, Apr. 1980, pp. 82–83.
*Modern Plastics*, Sep. 1980, pp. 14 and 16.
DesiCal Bulletin, "Calcium Oxide Dispersion in Liquid Form", Basic Chemicals (1977).
*Modern Plastics Encyclopedia*, (1978–1979), p. 50.
Allport & Janes, *Block Copolymers*, (John Wiley 1973), pp. 264–265.
*Derwent Abst.*, 43630 v/24, (3-5-74) (DL-104311), Hofman H.
*Chem. Abst.*, 80-84249a, (1974), Semancik et al.

*Primary Examiner*—Herbert J. Lilling
*Attorney, Agent, or Firm*—Lyell H. Carver

[57] ABSTRACT

Blends of a polyester with a desiccant and a poly(mono-1-olefin); optionally with an oil.

14 Claims, No Drawings

POLYESTER BLENDS CONTAINING A METAL OXIDE DESICCANT

This is a divisional application of copending application Ser. No. 296,089 filed Aug. 26, 1981, now U.S. Pat. No. 4,485,204, patented Nov. 27, 1984.

FIELD OF THE INVENTION

The invention pertains to improved polyester blends. In another aspect, the invention pertains to blends of a polyester with a desiccant and one or more of a poly(-mono-1-olefin), a block copolymer of diene/-monovinylarene, and a poly(monovinylarene). In another aspect, the invention pertains to improved polyethylene terephthalate blends derived from recycling of PET bottles.

BACKGROUND OF THE INVENTION

A major source of polyester, such as polyethylene terephthalate (PET), is the recycle of bottles made therefrom. These bottles conventionally are prepared from a polyethylene terephthalate resin with a base overlay cup of high density polyethylene (HDPE) resin. Paper labels, etc. are utilized.

The usual separation plant, such as described in *Modern Plastics*, Apr. 1980, page 82-3, crushes the received material, grinds it, and separates fines and paper labels through such as fluidized-bed separation procedures. The remaining materials primarily are polyethylene and polyethylele terephthalate. Further separatory procedures are employed to obtain these two materials as separate streams for individual recycle and reuse.

Recently, a foamed polystyrene wrap-around label has been applied to the PET body. This presents an additional problem, now adding a third major different polymer component to be separated.

Another problem experienced in the reuse of polyesters, whether obtained from PET bottle recycling or other, has been the fact that the thermoplastic polyesters are subject to hydrolysis in the presence of moisture when in the molten state during (re)processing. This hydrolysis results in a marked decrease in molecular weight, which then is reflected by marked lowering of physical properties, particularly toughness. To prevent hydrolysis during (re)processing, it has been necessary to dry the polyester to a moisture content of less than such as about 0.005 weight percent or less, a difficult procedure without deteriorating the polyester.

Needed are improved methods of reuse of the tremendous quantities of PET available in the form of recycle material. This material is either from recycle of the tremendous use of PET bottles, or from scrap in primary polyester bottle forming and other purposes. Just for example, the above referred to *Modern Plastics* article indicated an estimated 1.5 billion PET soft-drink bottles shipped during 1979, accounting for an approximate total of 150,000 metric tons of resin in that single usage. In the intervening time, this likely has doubled; presenting a large potential area for useful recycle. Additionally, probably equivalent quantities of PET are used elsewhere in many other applications presenting equivalent opportunities for recycle.

Brief Summary of the Invention

I have solved many of the problems in reusing polyesters. My invention is based on a blend of (a) a polyester and (c) a desiccant.

(A) By blending (a) the polyester with (b) a block copolymer of a conjugated diene with a monovinylarene, and (c) a desiccant selected from calcium, magnesium, strontium, barium, or aluminum oxides, I am able to produce a tough pliable product without the necessity of any drying, retaining essentially the effective properties of the polyester.

(B) In a further aspect of my invention, I blend (a) polyester, (b) the aforesaid block copolymer of a conjugated diene with a monovinylarene, (c) the aforesaid desiccant, further with (d) a poly(mono-olefin) such as high density polyethylene. This produces a tough, pliable product, with useful impact strength and elongation for injection molding, well suited as a substitute for impact polystyrene, for example.

(C) In another embodiment of my invention, I blend (a) polyester, (b) the block copolymer of a conjugated diene with a monovinylarene, (c) the desiccant, (d) the polymono-1-olefin, preferably high density polyethylene, and (e) a polymonovinylarene, preferably polystyrene. In accordance with this aspect of my invention, the product is a tough, pliable product, suitable for molding of high impact parts. The product can be prepared from blending, such as by grinding together, a PET bottle including the base cup and polystyrene label, supplementing with such added components as necessary for a blended product, and including my important additive the conjugated diene/monovinylarene block copolymer.

(D) In a further embodiment of my invention, I blend (a) the polyester, (d) the poly(mono-1-olefin), and the (c) desiccant.

In related aspects of any of the above, I further use (f) an oil, preferably a light mineral process oil.

DETAILED DESCRIPTION OF THE INVENTION

(a) Polyester

The (a) component is any of the polyesters known as polyester resins. These are described in detail in such as the *Condensed Chemical Dictionary*, 7th Edition, by Rose and Rose, pages 758–759 (Reinhold, New York, 1966). These polyesters also are described in such as *Block Copolymers* by Allport and Janes (John Wiley, 1973) pages 264 and following. Polyesters are prepared by esterification procedures, alcoholysis, acidolysis, ester-ester interchange, or reaction of acid chloride with alcohol, as described in many publications. Primary preparation, commercially, of course, is by esterification reaction of a polyol with a polyacid. Most important of the polyester resins are those designated as the polyalkylene terephthalates.

Particular types include such as polyethylene terephthalate, polypropylene terephthalate, polybutadiene terephthalate, and various blends of the polyalkylene terephthalates or reaction products of a mixture of reactants. Most important commercially at present are the polyethylene terephthalates (PET), having a density of the order of about 1.34 to 1.39 g/cc, commonly employed in the PET beverage bottles.

(b) Conjugated Diene Monovinylarene Block Copolymers

The (b) component is a block copolymer of a conjugated diene with a monovinylarene, with a sufficient balance of cojugated diene:monovinylarene to be designated as a thermoplastic of rubbery (elastomeric) character. These block copolymers can be depicted by the formula $(AB)_nY$ wherein A and B respectively represent segments or blocks of polymonovinylarene (polymonovinyl-substituted aromatic compound), and polyconjugated diene, and wherein Y is a residue of a polyfunctional initiator or a polyfunctional coupling agent. The block copolymers can be prepared either by polymerization procedures effective to prepare a linear block structure, or by sequential polymerization procedures with coupling, all as is well known in the art.

Suitable conjugated dienes are the hydrocarbon conjugated dienes used alone or in admixture, and containing of the order of 4 to 12 carbon atoms per molecule, more usually 4 to 8 carbon atoms per molecule, including such as 1,3-butadiene and isoprene, both of these presently being preferred, as well as such as 2,3-dimethyl-1,3-butadiene, piperylene, 3-butyl-1,3-octadiene, and the like.

Among the suitable monovinylarenes are those of 8 to 18 carbon atoms per molecule, such as the presently preferred styrene, as well as 3-methylstyrene, 4-n-propylstyrene, 4-cyclohexylstyrene, 4-decylstyrene, 2-ethyl-4-benzylstyrene, 4-p-tolylstyrene, the vinyl naphthalenes, and the like, alone or in admixture.

Among the presently preferred block copolymers are such as the butadiene/styrene block copolymers, in which the blocks can be homopolymeric, or tapered, isoprene/styrene block copolymers of similar nature, butadiene/styrene/vinyltoluene random block terpolymers, and other terpolymers such as the butadiene/styrene/alpha-methylstyrene block terpolymers. Most preferably the block copolymer will have a weight ratio of about 50:50 conjugated diene:monovinylarene copolymerized to 75:25, presently preferred about 60:40.

(d) Desiccant

The (c) component is a desiccant capable of absorbing or reacting with water, and is a desiccated component selected from the group consisting of calcium oxide, magnesium oxide, strontium oxide, barium oxide, aluminum oxide, partially hydrated aluminum oxide. Presently preferred is desiccated calcium oxide.

Presently preferred and available commercially is an admixture of either about 90 weight percent or 80 weight percent desiccated calcium oxide and correspondingly 10 or 20 weight of a light mineral process oil employed both to provide a convenient means of handling the desiccated calcium oxide in effectively powdery, yet easily flowing form, as well as protection of the desiccated calcium oxide from absorbing moisture, thus providing an easily dispersible form of the calcium oxide in polymers.

(d) Poly(mono-1-olefin)

The (d) component is a poly(mono-1-olefin), such as and presently particularly preferred a high density or low density polyethylene, most preferably high density polyethylene. Other poly(mono-1-olefin)s employable are the normally solid polypropylene, polybutylene, polyisobutylene, poly(1-pentene), ethylene/butylene copolymers, ethylene/1-hexene copolymers, and various blends thereof.

It should be noted that the term "polyethylene" in the industry has come to include a variety of copolymers in which several significant percents of butylene, isobutylene, or 1-hexane, are included in the generalized term "polyethylene".

Presently most preferred because of its use as a protective lower cup exteriorly on PET bottles is a high density polyethylene, of a density of about 0.93 to 0.97 g/cc.

(e) Poly(monovinylarene)

The (e) component is a poly(monovinylarene) (poly(monovinyl-substituted aromatic compound) based on hydrocarbon monovinylarenes. These are normally solid, resinous materials, well known in the art. Presently preferred are the commercially available polystyrenes. Alternatively, useful and suitable materials include such as poly(alpha-methylstyrene), poly(vinyltoluene), and various blends thereof. Particularly useful commercial polystyrenes are those having a density of about 1.03 g/cc and a melt flow of such as about 2.5 g/10 min. However, any of the poly(monovinylarenes) prepared from the monovinylarenes as detailed above are usable. Many of the poly(monovinylarenes) may contain as copolymerized component other ethylenically saturated compounds such as alpha-methylstyrene, acrylonitrile, methacrylates, and the like.

(f) Light Mineral Oil

The light mineral oil is an optional but desirable component in any of my blends. A suitable light mineral oil is described as a primarily paraffic and naphthenic oil derived from crude oil, coal, oil shale and the like, having an aromatic content of about 10 to 49 percent by weight, a specific gravity of about 0.85 to 0.95, a flash point of about 300° F. to 600° F., and a viscosity at 100° F. of about 60 to 3500 SUS.

COMPOSITIONS

In my blends, any suitable and effective proportions can be used. The percentages given below are recommended for most purposes, but it should be recognized that blends suitable for various applications can be made outside of the designated ranges.

It is recognized that the percentages in total may total greater than one hundred percent, but since the composition is limited to 100 percent, an increase in one component then is balanced by a decrease in one or more other components.

In my composition (A) of (a) polyester, (b) rubbery block copolymer, and (c) a desiccant, my inventive terblends are chosen in proportion so as to provide high impact strength, acceptable tensile properties, and hardness. Presently preferred are weight percentages of such as (a) about 50 to 90 weight percent polyester, more preferably about 70 to 85 weight percent; (b) about 5 to 40 weight percent rubbery block copolymer, more preferably about 10 to 20 weight percent; (c) about 3 to 20 weight percent of the designated desiccant, more preferably about 5 to 10 weight percent; and optionally (f) about 0.5 to 5, preferably about 1 to 2, weight percent of the light mineral oil.

In the embodiment of my invention (B) employing the (a) polyester, the (b) rubbery block copolymer, (c) the desiccant, and (d) a poly(mono-1-olefin), the proportions preferably should be in order of (a) about 50 to 90 weight percent polyester, more preferably about 60 to 80 weight percent; (b) about 3 to 30 weight percent of the rubbery block copolymer, more preferably about 10 to 20 weight percent; (c) about 3 to 20 weight percent of the aforesaid desiccant, more preferably about 5 to 10 weight percent; (d) about 3 to 25 weight percent of the poly(mono-1-olefin), more preferably about 5 to 10 weight percent; and, optionally (f) the light mineral oil in the amount described above, about 0.5 to 5, preferably about 1-2, weight percent.

In the further embodiment (C) including (e) a polymonovinylarene, presently suggested weight percents are of the order of (a) about 25 to 75 weight percent polyester, more preferably about 35 to 50 weight percent; (b) about 3 to 30 weight percent rubbery block copolymer, more preferably about 10 to 20 weight percent; (c) about 3 to 20 weight percent desiccant, more preferably about 10 to 20 weight percent; (d) about 10 to 35 weight percent poly(mono-1-olefin), more preferably about 20 to 25 weight percent, and (e) about 3 to 20 weight percent polymonovinylarene, more preferably about 5 to 10 weight percent; and optionally (f) about 0.5 to 5, preferably about 1 to 2, weight percent of the light mineral oil.

In my blend embodiment (D) including (a) a polyester, (d) the poly(mono-1-olefin), and (c) and the dessicant, the presently suggested weight percents are of the order of (a) about 50 to 90, more preferably about 80 to 90, weight percent; (d) about 3 to 20, preferably about 5 to 10, weight percent; and (c) about 3 to 20, preferably about 5 to 10, weight percent; and optionally (f) about 0.5 to 5, preferably about 1 to 2, weight percent.

Blending

My blends can be prepared, in any of the embodiments, by any conventional and suitable means for combining such ingredients, such as solution blending, milling, batch mixing, continuous extrusion, and the like.

The blends, of course, can contain conventional additives such as antioxidants, UV stabilizers, pigments, fillers, flame retardants, and the like, as in known in the arts. The percentages of materials employed in the suggested and preferred blends are based on the weight of the total polymeric ingredients plus desiccant, plus, where used, oil. These weights are exclusive of any of the other additives.

Preferably, my blends are prepared recycled PET beverage bottles, and effectively eliminate the need for separating bottles, base cups, polystyrene labels, soforth, before grinding. The blends can be prepared by dry blending, followed by subsequent extrusion at suitable melt temperatures into strands, cooling, cutting into pellets, and the like.

My blends can be molded by known molding processes, such as injection molding, into useful high impact resistant articles such as trays, containers, automotive parts, and the like.

Most usefully, when applied to the present PET composite bottles, I produce a useful product therefrom, and save considerable effort, work, and energy requirements otherwise presently consumed in present effects to separate the individual components into individual recycle streams for individual applications.

EXAMPLES

Examples provided are intended to assist one skilled in the art to a further understanding of the invention, and should be considered as such and as a part of my overall disclosure. Particular components employed should be considered as illustrative, and not limitative.

EXAMPLE I

In this example, the preparation and properties of my inventive terblends comprising polyester, a thermoplastic diene/monovinylarene copolymer, and a calcium oxide based desiccant are described.

The polyester used as a polyethylene terephthalate polymer regrind of recycled plastic beverage bottles and had a density of 1.34 to 1.39 gm/cc. The block copolymer used was a preferred thermoplastic butadiene/styrene copolymer Solprene ® 414P, a 60:40 weight ratio butadiene/styrene radial block copolymer, coupled with silicon tetrachloride, having a melt flow at 200° C./5 kg of 5.0±1.0 g/10 minutes (marketed by Phillips Chemical Co., a subsidary of Phillips Petroleum Company). Solprene 414P contains about 0.5 weight percent of BHT (2,6-di-t-butyl-p-cresol) and 0.5 weight percent of TNPP (tris[monotriphenyl]phosphite). The preferred desiccants used were Desical Liquid, a commercial powdery mixture of 80 or 90 weight percent of calcium oxide and 20 or 10 weight percent of a light mineral process oil (marketed by Basic Chemicals, a division of Basic, Inc.) The mineral oil functions both to protect the calcium oxide from moisture and as a processing aid to incorporate the desiccant into the polymer blend.

My inventive terblends were prepared by dry-blending 10-lb batches in a large Welex blender at a speed of 600–700 rpm, for 5-6 minutes. Blend compositions are listed in Recipes IA and IB:

| | Recipe IA | | | | | |
|---|---|---|---|---|---|---|
| | Run | | | | | |
| Compound | 1 Control | 2 Invention | 3 Invention | 4 Control | 5 Invention | 6 Invention |
| PET (Regrind), parts by wt. | 80 | 80 | 80 | 70 | 70 | 70 |
| Solprene 414P, parts by wt. | 20 | 20 | 20 | 30 | 30 | 30 |
| Desical$^a$, parts by wt. | — | 5 | 10 | — | 5 | 10 |

$^a$Desical XL-103, a powdery mixture of about 90 weight percent of calcium oxide and about 10 weight percent of a light mineral process oil, marketed by Basic Chemicals.

| | Recipe IB | | | | | |
|---|---|---|---|---|---|---|
| | Run | | | | | |
| Compound | 7 (Control) | 8 (Control) | 9 (Invention) | 10 (Invention) | 11 (Invention) | 12 (Invention) |
| PET (Regrind), parts by wt. | 100 | 100 | 85 | 80 | 75 | 70 |
| Solprene 414P, parts by wt. | — | — | 10 | 10 | 20 | 20 |
| Desical Liquid$^a$, parts by wt. | — | 10 | 5 | 10 | 5 | 10 |
| Weston 618$^b$, parts by wt. | — | — | 0.5 | 0.5 | 0.5 | 0.5 |

$^a$a powdery mixture of about 80 weight percent of calcium oxide in about 20 weight percent of a light mineral process oil; marketed by Basic Chemicals.
$^b$distearylpentaerythritol phosphite, an antioxidant marketed by Borg Warner Corp.

Subsequently, the blends were extruded in an NRM extruder (screw diameter: 2½ inches; L/d ratio 24:1), at a melt temperature of 505° F. and a screw speed of about 80 rpm. The extruded plastic strands were water cooled and cut into pellets.

Test specimens were prepared by injection molding in a Reed-Prentice molding apparatus at an average stock temperature during injection of 500°-520° F. The mold temperature was kept at 50°-75° F.; cycle time was 14 seconds per molded article.

Physical testing data of the line 12 blends prepared in accordance with Recipes IA and IB are listed in Tables IA and IB:

TABLE IA

| | Run | | | | | |
|---|---|---|---|---|---|---|
| | 1[a] (Control) | 2 (Invention) | 3 (Invention) | •4[a] (Control) | 5 (Invention) | 6 (Invention) |
| Flexural Modulus[b], psi × 10⁻³ | — | — | — | — | — | — |
| Tensile Strength at Yield[c], psi | — | 5050 | 4930 | — | 3960 | 4180 |
| Elongation at Break[c], % | — | 42 | 17 | — | 21 | 45 |
| Shore D Hardness[d] | — | 69 | 68 | — | 64 | 66 |
| Notched Izod Impact[e], ft lb/inch | — | 1.11 | 0.90 | — | 0.87 | 1.02 |
| Gardner Impact[f], inch-lb | — | 65 | 68 | — | 73 | 74 |
| Moisture Absorption[g], wt. % | — | 5 | 8 | — | 5 | 8 |

TABLE IB

| | Run | | | | | |
|---|---|---|---|---|---|---|
| | 7 (Control) | 8 (Control) | 9 (Invention) | 10 (Invention) | 11 (Invention) | 12 (Invention) |
| Flexural Modulus[b], psi × 10⁻³ | — | — | 261 | 256 | 192 | 196 |
| Tensile Strength at Yield[c], psi | 6380 | 8640 | 6360 | 5930 | 4310 | 4260 |
| Elongation at Break[c], % | 4 | 8 | 16 | 34 | 24 | 20 |
| Shore D Hardness[d] | 78 | 77 | 79 | 77 | 74 | 73 |
| Notched Izod Impact[e], ft × lb/inch | 0.62 | 0.46 | 0.92 | 1.06 | 0.76 | 1.22 |
| Gardner Impact[f], inch-lb | 6 | 8 | 75 | 86 | 131 | 115 |

Footnotes to Tables IA and IB
[a]too brittle to test
[b]determined according to ASTM D790
[c]determined according to ASTM D638
[d]determined according to ASTM D2240
[e]determined according to ASTM D256; thickness of specimen: ⅛ inch
[f]determined according to Instructional Manual of Gardner Laboratories, IG-1120, employing a ⅜ inch punch and a 4 lb weight
[g]after three weeks at 80 degrees F., relative humidity of 40%

Data in Table IA show that the brittle and essentially useless blends of polyphenylene terephthalate and Solprene 414P copolymer (Runs 1 and 4) can be converted into blends having excellent impact resistance, high hardness, and good tensile properties (Runs 2, 3, 5, 6).

Data in Table IB show that the impact resistance and elongation of a blend comprising polyethylene terephthalate and a calcium oxide desiccant (Run 8) can be drastically improved by the incorporation of Solprene 414P butadiene/styrene radial block copolymer. The effect of minute quantities of Weston 618 antioxidant upon physical properties of the prepared blends is believed to be negligible.

Data in Tables IA and IB clearly demonstrate that the addition of both a thermoplastic butadiene/styrene radial block copolymer and a calcium oxide desiccant to polyethylene terephthalate is required to obtain blends with desirable combinations of high impact resistance, good tensile properties, and high hardness. These blends are suitable for making useful molded articles, such as trays, containers, automotive parts, etc. Since my useful inventive terblends can be prepared from ground, recycled polyethylene terephthalate beverage bottles, practice of my invention is valuable in that in contributes to the improvement of the environment and to the conservation of raw materials.

EXAMPLE II

In this example, the preparation and properties of another set of inventive terblends are described. These terblends comprised polyethylene terephthalate, a high density polyethylene (Marlex 6006, density 0.963 g/cc; flow index CIL test procedure, 190° C., 1500 psi nitrogen pressure 3.5 g/10 minutes, marketed by Phillips Chemical Co., a subsidiary of Phillips Petroleum Co.) and a desiccant (Desical Liquid, described in Example I).

These terblends were blended, melt-extruded, and injection molded in accordance with the procedures described in Example I. Representative runs were prepared in accordance with Recipe II:

| Recipe II | | | | | |
|---|---|---|---|---|---|
| | Run | | | | |
| Compound | 8 (Control) | 13 (Invention) | 14 (Invention) | 15 (Invention) | 16 (Invention) |
| PET (Regrind)[a], parts by wt. | 100 | 90 | 85 | 85 | 80 |
| Polyethylene[b], parts by wt. | — | 5 | 10 | 5 | 10 |
| Desical Liquid[a], parts by wt. | 10 | 5 | 5 | 10 | 10 |
| Weston 618[c], parts by wt. | — | 0.5 | 0.5 | 0.5 | 0.5 |

[a]see Example I
[b]Marlex 6006 high-density polyethylene; density: 0.936 g/cc
[c]see Footnote to Recipe IB Physical properties of these runs are summarized in Table II:

TABLE II

| | Run | | | | |
|---|---|---|---|---|---|
| | 8 (Control) | 13 (Invention) | 14 (Invention) | 15 (Invention) | 16 (Invention) |
| Flexural Modulus[b], psi × 1[−3] | — | 301 | 264 | 295 | 266 |
| Tensile Strength at Yield[a], psi | 8640 | 7840 | 7090 | 6980 | 6410 |
| Elongation at Break[a], % | 8 | 47 | 11 | 27 | 26 |
| Shore D Hardness[a] | 77 | 79 | 77 | 79 | 76 |
| Notched Izod Impact, ft × lb/inch | 0.46 | 1.38 | 1.45 | 1.60 | 1.59 |
| Gardner Impact[a], inch-lb | 8 | 53 | 54 | 76 | 78 |

[a]see Footnotes to Table IA and IB

Data in Table II show that my inventive terblends comprising a polyethylene terephthalate, high density polyethylene, and a calcium oxide desiccant (Runs 13–16) have excellent impact, tensile and hardness properties. These terblends could be prepared by grinding plastic beverage bottle without separating the PET bottle and the PE base cup. The presence of the calcium oxide based desiccant will protect the polyethylene terephthalate from hydrolytic degradation during aging in the presence of humid air.

EXAMPLE III

Inventive, four-component blends comprising polyethylene terephthalate, high-density polyethylene, a thermoplastic butadiene/styrene block copolymer, and a calcium oxide based desiccant, were prepared in accordance with the procedure outlined in Example I. Blend compositions are given in Recipe III:

thermoplastic butadiene/styrene block copolymer (preferably Solprene 414P), a high density polyethylene (preferably Marlex 6006), a calcium oxide desiccant (preferably Desical Liquid), and, a polystyrene resin (preferably Cosden 550, marketed by Cosden Oil Company; melt flow: 2.5 g/10 minutes, determined at 200° C./5 kg, according to ASTM D1238 condition G; Vicat temperature of 220° F., according to ASTM 1525-70; density approximately 1.03 g/cc).

My inventive five-component blends were prepared by dry-blending 10-lb batches in a Welex blender, extruding the polymer at a melt temperature of 505° F. in an NRM melt-extruder and cutting the extruded, water-cooled polymer strands into pellets. Test specimens were prepared by injection molding at about 500° F. in an Arburg molding apparatus. The molding was done at a fast cycle (approximately 20 seconds) while the mold was kept cold.

Recipe III

| | Run | | | | | | |
|---|---|---|---|---|---|---|---|
| Compound | 8 (Control) | 17 (Invention) | 18 (Invention) | 19 (Invention) | 20 (Invention) | 21 (Invention) | 22 (Invention) |
| PET (Regrind)[a], parts by wt. | 100 | 80 | 75 | 75 | 70 | 65 | 60 |
| Solprene 414P[a], parts by wt. | — | 10 | 10 | 10 | 10 | 20 | 20 |
| Marlex HDPE[b], parts by wt. | — | 5 | 10 | 5 | 10 | 5 | 10 |
| Desical Liquid[c], parts by wt. | 10 | 5 | 5 | 10 | 10 | 10 | 10 |
| Weston, 618[c], parts by wt. | — | 0.5 | 0.5 | 0.5 | 0.5 | 0.5 | 0.5 |

[a]see Example I
[b]see Footnote to Recipe II
[c]see Footnote to Recipe IB

Physical test data for my inventive four-component blends are summarized in Table III:

TABLE III

| | Run | | | | | | |
|---|---|---|---|---|---|---|---|
| | 8 (Control) | 17 (Invention) | 18 (Invention) | 19 (Invention) | 20 (Invention) | 21 (Invention) | 22 (Invention) |
| Flexural Modulus[a], psi × 10[−3] | — | 234 | 220 | 226 | 211 | 177 | 161 |
| Tensile Strength at Yield[a], psi | 8640 | 5410 | 5130 | 5270 | 4900 | 4040 | 3560 |
| Elongation at Break[a], % | 8 | 12 | 13 | 11 | 12 | 8 | 8 |
| Shore D Hardness[a] | 77 | 75 | 73 | 74 | 74 | 70 | 70 |
| Notched Izod Impact[a], ft × lb/in | 0.46 | 0.87 | 0.85 | 0.81 | 0.76 | 0.58 | 0.55 |
| Gardner Impact[a], inch-lb | 8 | 44 | 45 | 33 | 36 | 49 | 47 |

[a]see Footnotes to Table IA and IB

These data show that the inventive blends (Runs 17–22) have superior impact properties versus a control blend comprising PET plus Desical (Run 8). Tensile properties and hardness, however, are lower than those of control 8. The inventive four-component blends of Runs 17–22 are less preferred than other inventive blends described in Examples I and II, but they are superior to all control blends (Runs 1, 4, 7, and 8).

EXAMPLE IV

Another embodiment of my invention is a five-component blend comprising polyethylene terphthalate, a Blend compositions are given in Recipe IV:

Recipe IV

| | Run | | | | |
|---|---|---|---|---|---|
| Compound | 23 (Control) | 24 (Invention) | 25 (Invention) | 26 (Invention) | 27 (Invention) |
| PET (Regrind)[a], parts by wt. | 90 | 50 | 45 | 40 | 35 |
| Desical Liquid[a], parts by wt. | 10 | 10 | 10 | 10 | 10 |
| Solprene 414P[a], parts by wt. | — | 10 | 10 | 20 | 20 |
| Polyethylene[b], parts by wt. | — | 25 | 25 | 25 | 25 |

-continued

Recipe IV

| Compound | Run 23 (Control) | 24 (Invention) | 25 (Invention) | 26 (Invention) | 27 (Invention) |
|---|---|---|---|---|---|
| Polystyrene[c], parts by wt. | — | 5 | 10 | 5 | 10 |

[a]see Footnote to Recipe IB
[b]see Footnote to Recipe II
[c]Cosden 550, density: about 1.03 g/cc; melt flow: 2.5 g/10 min.

Phycial properties are listed in Table IV:

TABLE IV

| | Run | | | | |
|---|---|---|---|---|---|
| | 23 (Control) | 24 (Invention) | 25 (Invention) | 26 (Invention) | 27 (Invention) |
| Flexural Modulus[a], psi × $10^{-3}$ | 323 | 176 | 177 | 130 | 127 |
| Tensile Strength at Yield[a], psi | 6240 | 4040 | 4100 | 3060 | 2920 |
| Elongation at Break[a], % | 9 | 20 | 14 | 17 | 35 |
| Shore D Hardness[a] | 66 | 60 | 62 | 66 | 60 |
| Heat Distortion at 66 psi[b], degrees F. | 181 | 178 | 182 | 177 | 178 |
| Notched Izod Impact[a], ft × lb/inch | 0.99 | 0.79 | 0.72 | 0.93 | 0.90 |
| Gardner Impact[a], inch-lb | 23 | 66 | 24 | 64 | 81 |

[a]see Footnotes to Tables IA and IB
[b]Determined according to ASTM D1637

My inventive five-component blends have higher Gardner impact resistance and higher elongation than a control blend (Run 23). Tensile properties, flexural moduli, and notched Izod impact are generally lower for my invention blends. My inventive five-component blends could be commerically prepared by grinding plastic beverage bottles without separating the polyethylene bottle parts, polyethylene base cups, and polystyrene wrap-around lables, and subsequently adding a thermoplastic butadiene/styrene copolymer and a suitable desiccant (for instance, Desical Liquid).

The disclosure, including data, has illustrated the value and effectiveness of my invention. These examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A composition consisting essentially of about 50 to 90 weight percent of at least one polyalkylene terephthalate polyester resin, about 3 to 20 weight percent of at least one desiccant, and about 3 to 20 weight percent of at least one normally solid poly(1-alkene); and optionally further about 0.5 to 5 weight percent of a light mineral oil;
wherein said desiccant is at least one of the group consisting of calcium oxide, magnesium oxide, strontium oxide, barium oxide, aluminum oxide.

2. The composition according to claim 1 including said light mineral oil.

3. The composition of claim 2 employing about 80 to 90 weight percent said polyalkylene terephthalate polyester resin, about 5 to 10 weight percent said desiccant, and about 5 to 10 weight percent said poly(1-alkene); and where present about 1 to 2 weight percent said light mineral oil.

4. The composition of claim 1 wherein said desiccant is a calcium oxide.

5. The composition of claim 1 wherein said polyalkylene terephthalate polyester resin is a polyethylene terephthalate, said desiccant is a calcium oxide, and said poly(1-alkene) is a polyethylene.

6. The composition of claim 5 wherein said polyethylene terephthalate is a PET bottle regrind.

7. The composition of claim 1 consisting of said polyalkylene terephthalate polyester resin, said desiccant, and said poly(1-alkene).

8. A polyester blend composition consisting essentially of effective proportions of:
about 50 to 90 weight percent of a polyalkylene terephthalate polyester resin,
about 3 to 20 weight percent of a desiccant,
about 3 to 20 weight percent of a normally solid poly(1-alkene), and
about 0.5 to 5 weight percent a light mineral oil;
wherein said desiccant is selected from at least one of the group consisting of calcium oxide, magnesium oxide, strontium oxide, barium oxide, and aluminum oxide.

9. The composition according to claim 8 wherein said polyalkylene terephthalate polyester resin is a polyethylene terephthalate.

10. The composition of claim 8 wherein said desiccant is a calcium oxide, and said poly(1-alkene) is a polyethylene.

11. The composition of claim 9 employing about 80 to 90 weight percent said polyethylene terephthalate, about 5 to 10 weight percent said desiccant, and about 5 to 10 weight percent said poly(1-alkene), and about 1 to 2 weight percent said light mineral oil.

12. The composition of claim 11 wherein said desiccant is a calcium oxide, and said poly(1-alkene) is polyethylene.

13. A polyester blend composition consisting of:
about 50 to 90 weight percent polyalkylene terephthalate resin,
about 3 to 20 weight percent of at least one desiccant selected from the group consisting of calcium oxide, magnesium oxide, strontium oxide, barium oxide, and aluminum oxide, and
about 3 to 25 weight percent of a poly($\alpha$-olefin);
and optionally about 0.5 to 5 weight percent of light mineral oil.

14. A polyester blend composition consisting of:
about 50 to 90 weight percent polyethylene terephthalate resin,
about 3 to 20 weight percent of at least one desiccant selected from the group consisting of calcium oxide, magnesium oxide, strontium oxide, barium oxide, and aluminum oxide,
about 3 to 20 weight percent poly($\alpha$-olefin);
and about 0.5 to 5 weight percent of light mineral oil.

* * * * *